United States Patent Office 3,798,236
Patented Mar. 19, 1974

3,798,236
INSECTICIDAL TRIENIC COMPOUNDS
AND PROCESS
Daniel Hainaut, Villemomble, Edmond Toromanoff, Paris, and Jean-Pierre Demoute, Montreuil-sous-Bois, France, assignors to Roussel-UCLAF, Paris, France
No Drawing. Filed July 25, 1972, Ser. No. 275,104
Claims priority, application France, July 27, 1971, 7127448
Int. Cl. C07d 65/08
U.S. Cl. 260—327 TH            13 Claims

ABSTRACT OF THE DISCLOSURE

Products having the formula:

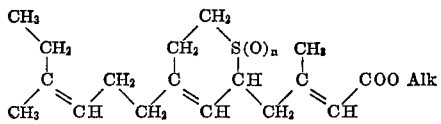

wherein $n$ represents an integer from 0 to 1 and Alk represents an alkyl having from 1 to 5 carbon atoms. These compounds possess remarkable insecticidal properties and are intermediates in the synthesis of the juvenile hormone.

OBJECTS OF THE INVENTION

An object of the present invention is the obtaining of products having the formula:

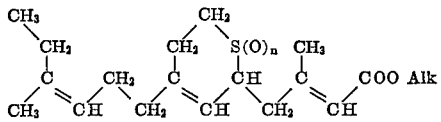

wherein $n$ represents an integer from 0 to 1 and Alk represents an alkyl having from 1 to 5 carbon atoms.

Another object of the present invention is the development of a process for the production of the above products.

A further object of the present invention is the development of a process for the production of the known alkyl, 3,11-dimethyl - 7-ethyl-2,6,10 - tridecatrienoate (E.E.Z. isomer) from the above product, where alkyl has from 1 to 5 carbon atoms.

A yet further object is the development of insecticidal compositions containing the above products.

These and other objects of the invention will become more apparent as the description thereof proceeds.

DESCRIPTION OF THE INVENTION

The above objects have been achieved by the obtaining of products having the formula:

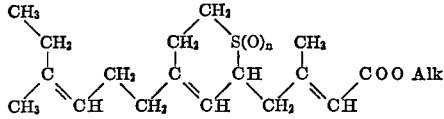

wherein $n$ represents an integer from 0 to 1 and Alk represents an alkyl having from 1 to 5 carbon atoms.

These new 2,4-disubstituted derivatives of 2H-thiapyran may also be represented by the Formula V':

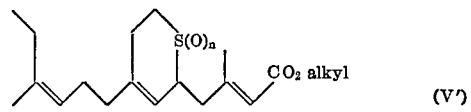

in which alkyl represents an alkyl having from 1 to 5 carbon atoms and $n$ represents 0 or 1. The alkyl radical is preferably methyl, ethyl, propyl, isopropyl, butyl, isobutyl or tertiary butyl. The derivatives of Formula V' possess remarkable insecticidal properties. They are especially active on larvae and pupae, but act equally in a very efficacious manner on any stage of the development of insects. When a larval form of an insect is treated by a derivative of Formula V', the development of the larvae is incomplete. The larvae die before moulting or are transformed into giant larvae possessing malformations and do not, in general, develop into normal adult forms.

The insecticidal activity of the derivatives of Formula V' is best shown by a test on larvae of *Dysderous intermedius*, *Tenebrio molitor*, *Rhodnius prolixus*, *Leptinotarsa decemlineata*, *Hyalophora cecropia*, *Aedes aegypti*, etc. An example of a test utilizing the larvae of *Dysdercus intermedius* is given hereafter.

The invention also relates to insecticidal compositions containing, as active matter, one or more of the derivatives of Formula V', containing possibly one or several other pesticidal agents. These compositions can be presented in the form of powders, granules, suspensions, emulsions, solutions for aerosols, lures or other preparations classically employed for the utilization of this type of product. In addition to the active principle or active principles, these compositions contain, in general, a vehicle and/or a non-ionic surface-active agent, assuring in addition a uniform dispersion of the constitutive substances of the mixture. The vehicle utilized can be liquid, such as water, alcohol, hydrocarbons, or other organic solvents, a mineral, animal or vegetable oil, or a powder such as talc, clays, silicates or kieselguhr.

For the insecticidal compositions, for example, an emulsifiable concentrate containing 0.1% by weight of the S-oxide of methyl-β-methyl-γ-[4 - (4'-methyl-3'-(Z)-hexenyl)-5,6-dihydro - 2H, 2 - thiapyranyl]-α-(E)-butenoate (V', where $n=1$ and alkyl=methyl), 5% of "Polysorbate 80," 94.8% of xylene and 0.1% of 2,4-dimethyl-6-tert.butylphenol can be utilized. These insecticidal compositions contain preferably from 0.001% to 2% of active material (compounds of Formula V'). They are prepared according to the methods usually utilized in this field.

The invention also relates to a process of preparation of derivatives of Formula V', characterized in that 4-methyl-3-hexenol or one of its functional derivatives is treated by a halogenation agent in order to obtain a 4-methyl-3-hexenyl halide of the General Formula II:

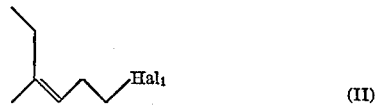

in which Hal₁ represents bromine or chlorine. This Compound II is treated with magnesium or lithium in order to obtain a compound of the General Formula III:

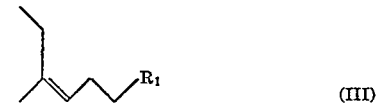

in which R₁ represents lithium or the group MgHal₁. This Compound III is reacted with thiacyclohexanone in order to obtain 4-(4'-methyl-3'-hexenyl)-4-hydroxytetrahydrothiapyran, which compound is treated with a dehydrating agent. The 4 - (4'-methyl-3'-hexenyl)-5,6-dihydro-2H-thiapyran obtained is reacted with an oxidation agent in order to form the S-oxide of 4-(4-methyl-3'-hexenyl)-5,6-dihydro-2H-thiapyran, which product is condensed in the presence of a strong base with an alkyl 3-methyl-4-halogeno-2-butenoate of the General Formula IV:

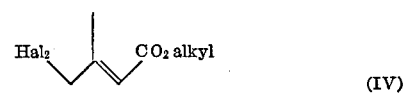

in which Hal₂ represents chlorine or bromine and alkyl represents an alkyl having from 1 to 5 carbon atoms in order to obtain the S-oxide of alkyl-β-methyl-γ-[4-(4'-methyl - 3' - hexenyl) - 5,6-dihydro-2H,2-thiapyranyl]-α-butenoate of the General Formula V:

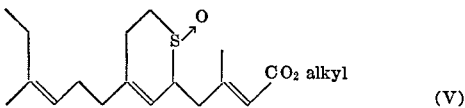
(V)

corresponding to Formula V', in which $n=1$. This compound, if desired, can be treated with a reducing agent in order to form alkyl-β-methyl-γ-[4-(4'-methyl-3'-hexenyl) - 5,6 - dihydro-2H,2-thiapyranyl]-α-butenoate of the General Formula IV:

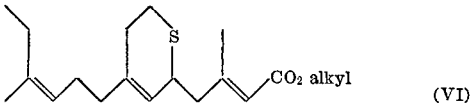
(VI)

corresponding to the Formula V', in which $n=0$.

According to the invention, it is equally possible to prepare alkyl β-methyl-γ-[4'-methyl-3'-hexenyl)-5,6-dihydro-2H,2-thiapyranyl]-α-butenoate of the General Formula VI, (Formula V' with $n=0$), without having recourse, on one hand, to the oxidation of the sulfur atom of 4-(4'-methyl - 3' - hexenyl)-5,6-dihydro-2H-thiapyran and, on the other hand, to the reduction of the S-oxide of alkyl β - methyl - γ - [4 - (4'-methyl-3'-hexenyl)-5,6-dihydro-2H,2-thiapyranyl]-α-butenoate of the General Formula V (Formula V' with $n=1$).

This process is characterized in that 4-(4'-methyl-3'-hexenyl)-5,6-dihydro-2H-thiapyran is condensed with an alkyl - 3 - methyl - 4-halogeno-2-butenoate of the General Formula IV:

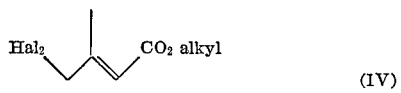
(IV)

in which Hal₂ and alkyl have the above given meanings, in the presence of a strong base.

The process of the invention is advantageously executed as follows:

(1) The halogenation agent which is utilized for the treatment of 4-methyl-3-hexenol or one of its functional derivatives is lithium bromide. It is also possible to use other halogenation agents such as sodium bromide, calcium bromide, the bromine triphenylphosphine complex, phosphorus oxychloride, thionyl chloride, etc.

(2) The functional derivative of 4-methyl-3-hexenol which is treated with a halogenation agent is preferably the paratoluene sulfonate of 4-methyl-3-hexenol.

(3) The dehydration agent with which 4-(4'-methyl-3'-hexenyl)-4-hydroxy-tetrahydrothiapyran is treated, is particularly phosphorus oxychloride. Other dehydration agents such as thionyl chloride can also be used. This reaction is effected preferentially in the presence of a tertiary amine such as pyridine, collidine or a dialkylaniline.

(4) The oxidation agent which is reacted with 4-(4'-methyl-3'-hexenyl)-5,6-dihydro-2H-thiapyran is hydrogen peroxide. Sodium metaperiodate, potassium permanganate or a peracid such as metachloroperbenzoic acid can equally be utilized.

(5) The strong base in the presence of which the condensation of the S-oxide of 4-(4'-methyl-3'-hexenyl)-5,6-dihydro-2H-thiapyran with the alkyl 3-methyl-4-halogeno-2-butenoate of the General Formula IV, is effected, is butyl lithium. The reaction is conducted in a solvent such as ethyl ether. Sodium hydride, sodium amide or sodium tert.-butylate can also be utilized as a strong base, and tetrahydrofuran, dimethylformamide and dimethylsulfoxide can be utilized as a solvent.

(6) The reducing agent with which the S-oxide of alky β - methyl - γ-[4-(4'-methyl-3'-hexenyl)-5,6-dihydro-2H, 2-thiapyranyl]-α-butenoate of the General Formula V, is treated, is anhydrous stannous chloride in the presence of acetyl chloride, and the reaction is conducted in a mixture of solvents constituted by dimethylformamide and acetonitrile. It is also possible to utilize other reducing agents, such as titanium trichloride.

(7) The strong base in the presence of which an alkyl 3-methyl-4-halogeno-2-butenoate is condensed with 4-(4'-methyl - 3' - hexenyl)-5,6-dihydro-2H-thiapyran is n-butyl lithium, but other strong bases such as alkali metal lower alkanolates, such as sodium methylate or amides such as sodium amide can be utilized.

As has been indicated above, the compounds of Formula V' possess remarkable insecticidal properties. Moreover, these products are utilized as precursors is the synthesis of the juvenile hormone.

Thus, the invention has also for an object a process of preparation of an alkyl 3,11-dimethyl-7-ethyl-2,6,10-tridecatrienoate of the General Formula I:

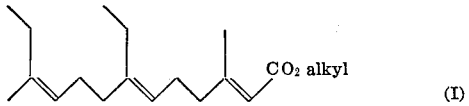
(I)

in which alkyl represents an alkyl having from 1 to 5 carbon atoms, starting from the new derivatives of Formula V'.

These compounds of Formula I possess a very important industrial interest. In effect, they can serve particularly as intermediates for the synthesis of methyl 3,11-dimethyl-7-ethyl-10-epoxy-2,6-tridecadienoate, also called the juvenile hormone, and of its analogs. It is known that the juvenile hormone is a natural product which can be extracted from the abdomen tissues of the adult male of *Hyalophora cecropia* [Williams, Nature, London, 178, 212 (1956)]. The juvenile hormone possesses a biological activity and particularly a very interesting insecticidal activity. It is also known that due to the costly and uncertain supply of the starting material, and to a difficult purification, the process of extraction has been abandoned in favor of synthetic methods. Numerous processes of preparation of the juvenile hormone are known. (See among others on this subject Dahm [J. Am. Chem. Soc. 89, 5292 (1967)].) However, all the known processes present a certain number of inconveniences. These processes are either multistep linear synthesis, and thus rarely commercialized because particularly of the very important number of steps, or multistep convergent syntheses which do not present sufficient stereospecific characteristics.

It is known that especially the isomer possessing the structure of the juvenile hormone presents a biological activity of the highest interest. This is the E.E.Z. isomer of methyl-3,11-dimethyl-7-ethyl-10-epoxy - 2,6 - tridecadienoate.

The process for the preparation of the compounds of Formula I is characterized in that either (1) a compound of Formula V', in which $n$ is equal to 1, is subjected to the simultaneous action of a reducing and desulfurization agent, (2) or a compound of formula V' in which $n$ is equal to 0, is subjected to the action of a desulfurization agent.

The process of preparation of the compounds of Formula I is executed advantageously as follows:

(1) The simultaneous reducing and desulfurization agent utilized in order to transform an S-oxide of alkyl β-methyl-γ-[4-(4'-methyl-3'-hexenyl)-5,6-dihydro - 2H,2 - thiapyranyl]-α-butenoate of Formula V (Formula V' with $n=1$) into alkyl 3,11-dimethyl-7-ethyl-2,6,10-tridecatrienoate is nickel prepared according to the Raney method and called the W₂, but other Raney nickles such as the W₄ and W₇ can also be employed, or even another application agent can be employed.

(2) The desulfurization agent with which the alkyl β-methyl-γ-[4 - (4'-methyl - 3' - hexenyl) - 5,6-dihydro-2H, 2-thiapyranyl]-α-butenoate of Formula VI (Formula V' with n=0) is treated, is nickel prepared according to the Raney method called W₂. It is to be understood that one can also utilize other sorts of Raney nickel such as the W₄ and W₇, or even another appropriate desulfurization agent.

It is to be remarked that the process described above is entirely stereoselective. For this, the geometrical configuration of the central double bond is set by inserting it in a cyclic system which subsequently is removed. This stereoselectivity of the reactions of the said process allows the obtaining solely of the desired stereoisomer while excluding all other stereoisomers. Another interest of the said process resides in the fact that the synthesis is convergent and the number of steps in relatively low.

The example which follows illustrates the invention without, however, limiting it.

EXAMPLE 1

Methyl 3,11-dimethyl-7-ethyl-2,6,10-tridecatrienoate (E.E.Z. isomer)

Step A: 4-methyl-3-hexenyl bromide (isomer Z).—158 gm. of the paratoluene sulfonate of 4-methyl-3-hexenyl (isomer Z) (obtained according to the process described by Corey et al., J. Am. Chem. Soc., 90, 5618 (1968), were placed in suspension in 750 cc. of acetone. The suspension was cooled to 10° to 15° C. and 150 gm. of lithium bromide was added. The suspension was agitated for a period of 17 hours at room temperature, and then poured into water. The aqueous suspension was extracted with benzene. The benzenic phases were washed with water, dried over sodium sulfate, and the solvent distilled therefrom. Thereafter, the residue as rectified under vacuum. 51 gm. of 4-methyl-3-hexenyl bromide (isomer Z) were obtained in the form of a colorless liquid, insoluble in water, boiling at 60° C. under 11 mm. of mercury.

*Analysis.*—C₇H₁₃Br; molecular weight=177.09. Calculated (percent): C, 47.48; H, 7.40; Br, 45.12. Found (percent): C, 47.1; H, 7.4; Br, 45.4

Step B: 4-(4'-methyl-3'-hexenyl)-4-hydroxy-tetrahydrothiapyran (isomer Z).—2 gm. of lithium were introduced into 50 cc. of ether. A solution of 23.2 gm. of 4-methyl-3-hexenyl bromide (isomer Z) in 200 cc. of ether were added thereto under an inert atmosphere. The mixture was agitated for two hours and 30 minutes, then cooled to −15° C. under agitation and under an inert atmosphere. 13.5 gm. of thiacyclohexanone and 100 cc. of tetrahydrofuran were added and the mixture was agitated for a period of 10 minutes at 0° C. The reaction mixture was then poured into a saturated aqueous solution of ammonium chloride and iced. The organic phase was decanted and the aqueous phase extracted with methylene chloride. The organic phases were combined, washed with water, dried over sodium sulfate and evaporated to dryness. The residue was subjected to chromatography through silica with elution with a mixture of petroleum ether and ethyl acetate (8:2). After evaporation of the eluant, 9.1 gm. of 4-(4'-methyl-3'-hexenyl) - 4 - hydroxy-tetrahydrothiapyran (isomer Z) were obtained in the form of colorless crystals, which were soluble in the most part of organic solvents, insoluble in water, and melted at about 40° C.

*Analysis.*—C₁₂H₂₂OS; molecular weight=214.37; Calculated (percent): C, 67.24; H, 10.34; S, 14.95; Found (percent): C, 67.6; H, 10.3; S, 14.9

I.R. spectra (chloroform): Presence of OH

4 - (4' - methyl - 3' - hexenyl) - 4 - hydroxytetrahydrothiapyran (isomer Z) can also be obtained in the following manner:

Step A': 4-methyl-3-hexene magnesium bromide.—18.5 gm. of magnesium were mixed with 100 cc. of ether. 12 gm. of 4-methyl-3-hexenyl bromide (isomer Z) were added thereto. Then a solution of 113 gm. of 4-methyl-3-hexenyl bromide (isomer Z) in 300 cc. of ether were added thereto, while maintaining the temperature at 15 to 20° C. The reaction mixture was agitated for a period of 2 hours at 20° C. A solution of 4-methyl-3-hexene magnesium bromide was obtained testing 1.23 N.

Step B': 4-(4'-methyl-3'-hexenyl)-4-hydroxytetrahydrothiapyran (isomer Z).—80 cc. of the ethereal solution of the 4-methyl-3-hexene magnesium bromide were heated to reflux. A solution of 8.2 gm. of thiacyclohexanone in 130 cc. of ether were added thereto, and the reaction mixture was agitated for 5 minutes at reflux. Thereafter, the mixture was cooled to 20° C., and poured into a saturated aqueous solution of ammonium chloride. The aqueous mixture was extracted with ether. The ethereal phases were dried over sodium sulfate and evaporated to dryness. The residue was subjected to chromatography through silica with elution, with a mixture of petroleum ether, chloroform, and ethyl acetate (50:50:25). After evaporation to dryness, 4.3 gm. of 4-(4'-methyl-3'-hexenyl)-4-hydroxytetrahydrothiapyran (isomer Z) were obtained, which product was identical to the precedingly obtained product.

Step C: 4-(4'-methyl-3'-hexenyl)-5,6-dihydro - 2H-thiapyran (isomer Z).—16.5 gm. of 4-(4'-methyl-3'-hexenyl)-4-hydroxytetrahydrothiapyran (Z) and 170° cc. of pyridine were mixed. 24 cc. of phosphorus oxychloride, cooled to 0° C., was added thereto. The mixture was agitated for 60 hours under an atmosphere of nitrogen. The reaction mixture was then poured into a saturated aqueous solution of sodium bicarbonate and extracted with methylene chloride. The organic phases were washed with water, dried over sodium sulfate, and evaporated to dryness. The pyridine was eliminated by distillation under a vacuum of 0.1 mm. of mercury. 15.6 gm. of 4-(4'-methyl-3'-hexenyl)-5,6-dihydro-2H-thiapyran (isomer Z) were obtained, which product was utilized as such in the following step. The compound occurs in the form of a colorless liquid, soluble in ether and chloroform, slightly soluble in methanol and insoluble in water.

Step D: S-oxide of 4-(4'-methyl-3'-hexenyl)-5,6-dihydro-2H-thiapyran (isomer Z).—6 gm. of 4-(4'-methyl-3'-hexenyl)-5,6 - dihydro - 2H - thiapyran (isomer Z) were cooled to 0° C. 14 cc. of hydrogen peroxide solution containing 110 volumes were added thereto, and the mixture was brought to room temperature. Then the mixture was heated to 40 to 45° C. for one hour. The reaction mixture was next poured into a cooled aqueous solution of sodium acid sulfite and extracted with chloroform. The organic phase was dried over sodium sulfate and evaporated to dryness. The residue was subject to chromotography through silica with elution with a mixture of benzene, chloroform and acetone (1:1:1). After evaporation of the eluant, 4.35 gm. of the S-oxide of 4-(4'-methyl-3'-hexenyl)-5,6-dihydro-2H-thiapyran (isomer Z) were obtained in the form of a colorless liquid, soluble in chloroform and slightly soluble in water.

I. R. spectra (chloroform): Presence of sulfoxide at 1036 cm⁻¹.

Step E: The S-oxide of methyl β-methyl-γ-[4'-methyl-3'-(Z)-hexenyl)-5,6-dihydro-2H,2 - thiapyranyl] - α-(E)-butenoate.—2.4 gm. of the S-oxide of 4-(4'-methyl-3'-hexenyl)-5,6-dihydro-2H-thiapyran (isomer Z) were subjected to a vacuum of 0.05 mm. of mercury at 40° C. for 30 minutes and thereafter 30 cc. of ether were added. The mixture was cooled to −40° C. and 9 cc. of a hexane solution of butyllithium 1.6 N and 20 cc. of ether were added, and the mixture was agitated for 15 minutes at −40° C. 2.9 gm. of methyl 3-methyl-4-bromo-2-butenoate (isomer E) in 20 cc. of ether were added thereto, and the mixture was agitated for one hour at −40° C., then allowed to stand overnight at −60° C. The reaction mixture was next brought to 0 to +5° C. and poured into a saturated aqueous solution of iced ammonium chloride. The aqueous mixture was extracted with chloroform. The organic phases were washed with water, dried over sodium sulfate and evaporated to dryness. The residue was subject to chromatography through silica with elution with a mixture of benzene, chloroform and acetone (1:1:1). After evaporation of the eluant 1 gm. of the S-oxide of methyl β-methyl-γ-[4-(4'-methyl-3'-(Z)-hexenyl) - 5,6 - dihydro-2H, 2-thiapyranyl]-α-(E)-butenoate were obtained in the form of a colorless liquid soluble in the most part of the usual organic solvents, and slightly soluble in water.

The S-oxide of methyl β-methyl-γ-[4-(4'-methyl-3'-(Z)-hexenyl)-5,6-dihydro - 2H,2-thiapyranyl]-α - (E)-butenoate can also be prepared in the following manner:

A solution of 0.710 gm. of the S-oxide of 4-(4'-methyl-3'-hexenyl)-5,6-dihydro-2H-thiapyran (isomer Z) in 12 cc. of tetrahydrofuran was cooled to —50° C. under agitation and under nitrogen. Next, 0.55 cc. of lithium diisopropylamide, then 2.5 cc. of a hexane solution of butyl lithium 1.6 N were added. The reaction mixture was allowed to stand for 30 minutes at a temperature of —50° to —60° C. Thereafter, 770 mg. of methyl 3-methyl-4-bromo-2-butenoate (isomer E) in 3 cc. of tetrahydrofuran were added thereto slowly. The mixture was agitated for one hour at —40° C. and allowed to stand overnight at —60° C. The reaction mixture was then brought to a temperature of 0 to +5° C. and poured into a saturated aqueous solution of iced ammonium chloride. The aqueous mixture was extracted with chloroform. The organic phases were washed with water, dried over sodium sulfate and evaporated to dryness under reduced pressure. The residue was subject to chromatography through silica with elution with a mixture of benzene, chloroform and actone (1:1:1). After evaporation of the eluant 650 mg. of the S-oxide of methyl β-methyl-γ-[4-(4'-methyl-3'-(Z)-hexenyl)-5,6-dihydro-2H,2-thiapyranyl] - α-(E)-butenoate were obtained.

Step F: Methyl β-methyl-γ-[4-(4'-methyl-3' - (Z)-hexenyl)-5,6-dihydro-2H-2-thiapyranyl]-α - (E)-butenoate.—1.8 gm. of the S-oxide of methyl β-methyl - γ - [4 - (4'-methyl-3'-(Z)-hexenyl)-5,6-dihydro - 2H,2 - thiapyranyl]-α-(E)-butenoate were mixed with 10 cc. of dimethylformamide, 20 cc. of acetonitrile and 2.5 gm. of stannous chloride. The mixture was cooled to 0 to +5° C. 2 cc. of acetyl chloride and 10 cc. of acetonitrile were then added under nitrogen, and the reaction mixture was agitated for 15 minutes at 0° C. The reaction mixture was next poured into iced water and extracted with petroleum ether. The organic phases were washed with water, dried over sodium sulfate and evaporated to dryness. 1.6 gm. of methyl β-methyl-γ-[4-(4'-methyl-3'-(Z)-hexenyl)-5,6-dihydro - 2H, 2, thiapyranyl]-α-(E)-butenoate were obtained in the form of a colorless liquid, soluble in the most part of the usual organic solvents, and insoluble in water.

Analysis.—$C_{18}H_{28}O_2S$; molecular weight=308.49; Calculated (percent): C, 70.09; H, 9.15; S, 10.39. Found (percent): C, 70.4; H, 9.1; S, 10.6

Methyl β - methyl-γ-[4-(4'-methyl-3'-(Z)-hexenyl)-5,6-dihydro-2H,2-thiapyranyl]-α-(E)-butenoate can also be obtained starting from 4-(4'-methyl-3'-hexenyl)-5,6-dihydro-2H-thiapyran (isomer Z) in the following manner:

2.5 gm. of 4-(4'-methyl - 3'-hexenyl)-5,6-dihydro-2H-thiapyran (isomer Z) were subjected to a vacuum of 0.05 mm. of mercury for 30 minutes. Then 30 cc. of anhydrous ethyl ether were added, and the mixture was cooled to —20° C. 9 cc. of butyl lithium in solution in hexane (1.6 N), then 20 cc. of anhydrous ethyl ether were added thereto drop by drop, under agitation and under an atmosphere of nitrogen. Then the agitation was continued at —20° C. for 15 minutes and thereafter 2.9 gm. of methyl 3-methyl-4-bromo-2-butenoate (isomer E) and 20 cc. of anhydrous ethyl ether were added thereto. The reaction mixture was agitated for one hour at —20° C., then allowed to stand overnight at —60° C. Next the temperature was allowed to return to about 0° C. and the reaction mixture was poured into a saturated aqueous solution of iced ammonium chloride. The aqueous mixture was extracted with chloroform. The organic phases were washed with water, dried over sodium sulfate and evaporated to dryness under reduced pressure. The desired product was obtained.

Step G: Methyl 3,11-dimethyl-7-ethyl-2,6,10-tridecatrienoate (isomer E.E.Z.).—A mixture of 278 mg. of methyl β - methyl - γ-[4-(4'-methyl-3'-(Z)-hexenyl)-5,6-dihydro-2H,2-thiapyranyl]-α-(E)-butenoate, 10 cc. of acetone and 10 cc. of an ethanolic suspension of $W_2$ Raney nickel were agitated for a period of 2 hours at room temperature, and then filtered. The filter was washed with ethanol. The filtrate was combined and the solvents evaporated therefrom. 200 mg. of a product were obtained which was purified by chromatography through a column of silica impregnated with silver nitrate (eluant: benzene-cyclohexane 8:2). The methyl 3,11-dimethyl-7-ethyl-2,6,10-tridecatrienoate obtained was identical to that described by Rohler J.A.C.S., 89, 5293 (1967).

The methyl 3,11-dimethyl-7-ethyl-2,6,10-tridecatrienoate can also be prepared according to the following manner:

A mixture of 830 mg. of methyl β-methyl-γ-[4-(4'-methyl - 3' - (Z)-hexenyl)-5,6-dihydro-2H,2-thiapyranyl]-α-(E)-butenoate, 12 cc. of dimethyl sulfoxide on siliporite and 8 cc. of an ethanolic suspension of Raney nickel were agitated for one hour at room temperature. Then the mixture was diluted with 50 cc. of benzene, filtered, and the filter was washed with benzene. The filtrate was evaporated under reduced pressure and the residue was poured into water. The aqueous phase was extracted with petroleum ether (35° to 70° C.).

The organic phases were washed with water, dried over sodium sulfate and evaporated to dryness under reduced pressure. The residue obtained (being 620 mg.) was purified by chromatography and methyl 3,11-dimethyl-7-ethyl-2,6,10-tridecatrienoate was obtained. By operating in the same manner, but while utilizing diethyl sulfoxide, in place of dimethyl sulfoxide, analogous results were obtained.

Methyl 3,11 - dimethyl - 7 - ethyl-2,6,10-tridecatrienoate (isomer E.E.Z.) can also be obtained starting from the S-oxide of methyl β-methyl-γ-[4-(4'-methyl-3'-(Z)-hexenyl)-5,6-dihydro-2H,2-thiapyranyl]-α-(E)-butenoate in the following manner:

10 cc. of a suspension of Raney nickel $W_2$ in ethanol were added to a solution of 309.5 mg. of the S-oxide of methyl β - methyl-γ-[4-(4'-methyl-3'-(Z)-hexenyl)-5,6-dihydro-2H,2-thiapyranyl]-α-(E)-butenoate in 10 cc. of acetone. The reaction mixture was agitated for two hours at 20° to 25° C., then filtered in order to eliminate the nickel. The filter was washed abundantly with ethanol. The filtrate was evaporated under reduced pressure. 200 mg. of the E.E.Z. isomer of methyl 3,11-dimethyl-7-ethyl-2,6,10-tridecatrienoate were obtained.

EXAMPLE 2

Study of the insecticidal properties of the S-oxide of methyl - γ - [4-(4'-methyl-3'-(Z)-hexenyl)-5,6-dihydro-2H,2-thiapyranyl]-α-(E)-butenoate (Compound A)

The test was effected on larvae of *Dysdercus intermedius* at the last stage of their development. An acetonic solution containing 10 gm. per liter was applied topically on the abdominal tergites of larvae in an amount of 10 micro liters, being $100 \times 10^{-6}$ gm. of the compound to be tested per insect. Ten insects per dose were utilized. Thereafter, the larvae were examined daily after the treatment. The examination determined the stage attained by the larvae, and allowed a determination of values from 0 to 5. The value 5 corresponded to the obtention of a giant larvae not having transformed into an adult. The intermediate values are applied to individuals having molted more or less completely, but having been brought to more or less abnormal forms. The tests are effected in parallel with control larvae which undergo no treatment.

The following table gives the experimental results obtained with the Compound A.

TABLE

| Product | Dose in μg. per individual | No. of the individual | Molting of the individual | Death of the individuals treated | Observations | Values |
|---|---|---|---|---|---|---|
| Compound A | 100 | 1 | 9/1 | 9/10 | Giant larvae | 5 |
|  |  | 2 | 9/1 |  | do | 5 |
|  |  | 3 | 9/1 | 9/1 | Giant larvae death in course of molting | 5 |
|  |  | 4 | 9/1 |  | Giant larvae | 5 |
|  |  | 5 |  | 9/3 | Dead larvae |  |
|  |  | 6 |  | 8/30 | do |  |
|  |  | 7 | 9/1 |  | Giant larvae | 5 |
|  |  | 8 | 9/1 |  | do | 5 |
|  |  | 9 | 9/1 |  | do | 5 |
|  |  | 10 |  | 9/7 | Dead larvae |  |
| Controls | 0 | 1 | 9/2 |  | Normal female | 0 |
|  |  | 2 |  | 8/25 | Larvae dead 8/25 |  |
|  |  | 3 |  | 9/8 | Larvae dead 9/2 | 0 |
|  |  | 4 | 9/2 |  | Normal male | 0 |
|  |  | 5 | 9/2 |  | do | 0 |
|  |  | 6 | 9/2 |  | Normal female | 0 |
|  |  | 7 | 9/2 |  | do | 0 |
|  |  | 8 | 9/2 |  | do | 0 |
|  |  | 9 | 9/2 |  | do | 0 |
|  |  | 10 | 9/6 |  | do | 0 |

Dates: Treatment: 8/24  End of test: 9/10

These results indicate particularly that Compound A, under the conditions of the test, is endowed with a good activity since on the ten larvae treated, three were dead before having molted, one died in the course of molting, and six gave giant larvae not having been transformed into adult individuals. The same test, as above, gives an average value of 4.5 to methyl β-methyl-γ-[4-(4'-methyl-3'-(Z)-hexenyl)-5,6-dihydro - 2H,2 - thiapyranyl]-α-(E)-butenoate. In addition, with this product, a greater number of larvae die before molting than with Compound A.

The preceding specific embodiments are illustrative of the practice of the invention. It is to be understood, however, that other expedients known to those skilled in the art, or disclosed herein, may be employed without departing from the spirit of the invention or the scope of the appended claims.

We claim:

1. A product having the formula

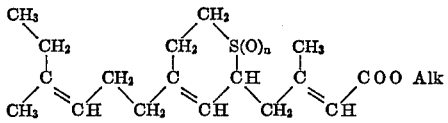

wherein $n$ represents an integer from 0 to 1 and Alk represents an alkyl having from 1 to 5 carbon atoms.

2. The product of claim 1 wherein $n$ equals 0.

3. The product of claim 1 wherein $n$ equals 1.

4. A process for the preparation of the product of claim 1 which consists essentially of the steps of (1) reacting a compound selected from the group consisting of 4-methyl-3-hexenol and its esters with a halogenating agent selected from the group consisting of chlorinating agents and brominating agents, (2) reacting the resulting halide having the formula

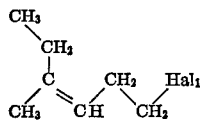

wherein $Hal_1$ represents a member selected from the group consisting of bromide and chloride with a metal reactant selected from the group consisting of magnesium and lithium, (3) reacting the resulting compound having the formula

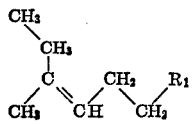

wherein $R_1$ represents a member selected from the group consisting of lithium and $MgHal_1$, $Hal_1$ having the above meanings, with thiacyclohexanone, (4) dehydrating the resulting 4-(4'-methyl-3'-hexenyl)-4-hydroxy - tetrahydrothiapyran by the action of a dehydrating agent, (5) oxidizing the resulting 4-(4'-methyl-3'-hexenyl)-5,6-dihydro-2H-thiapyran by the action of an oxidation agent for sulfur, (6) condensing the resulting S-oxide of 4-(4'-methyl-3'-hexenyl)-5,6-dihydro - 2H - thiapyran with a butenoate having the formula

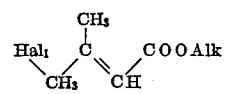

wherein $Hal_1$ has the above meanings and Alk represents alkyl having 1 to 5 carbon atoms in the presence of a strong base, (7) recovering the S-oxide of claim 1, wherein $n=1$, and reducing the S-oxide by the action of a reducing agent to recover the product of claim 1 where $n=0$.

5. The process for the production of the product of claim 1, wherein $n=0$, which consists in reacting 4-(4'-methyl-3'-hexenyl)-5,6-dihydro - 2H - thiapyran with a butenoate having the formula

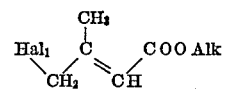

wherein $Hal_1$ represents a member selected from the group consisting of bromide and chloride and Alk represents alkyl having 1 to 5 carbon atoms, in the presence of a strong base, and recovering the product of claim 1 where $n=0$.

6. The process of claim 4, Step 1, wherein said halogenating agent is lithium bromide.

7. The process of claim 4, Step 1, wherein said ester of 4-methyl-3-hexenol is the paratoluene sulfonate of 4-methyl-5-hexenol.

8. The process of claim 4, Step 4, wherein said dehydrating agent is phosphorus oxychloride.

9. The process of claim 8 wherein said dehydrating step with phosphorus oxychloride is conducted in the presence of a tertiary amine.

10. The process of claim 4, Step 5, wherein said oxidation agent for sulfur is hydrogen peroxide.

11. The process of claim 4, Step 6, wherein said strong base is butyl lithium.

12. The process of claim 4, Step 7, wherein said reducing agent is anhydrous stannous chloride in the presence of acetyl chloride.

13. The process of claim 5 wherein said strong base is butyl lithium.

References Cited

Onesta, et al., Chem. Abs., 54: 22618–9 (1960).

HENRY R. JILES, Primary Examiner
C. M. S. JAISLE, Assistant Examiner

U.S. Cl. X.R.
260—405.5; 424—275

UNITED STATES PATENT OFFICE
CERTIFICATE OF CORRECTION

Patent No. 3,798,236  Dated March 19, 1974

Inventor(s) Daniel Hainaut et al.

It is certified that error appears in the above-identified patent and that said Letters Patent are hereby corrected as shown below:

Column 3, line 22, "β-methyl-γ-[4'" should read -- β-methyl-γ-[4-(4' --. Column 8, line 55, "S-oxide of methyl-γ-" should read -- S-oxide of methyl β-methyl-γ- --. Column 9, lines 70 to 75, the formula should appear as shown below:

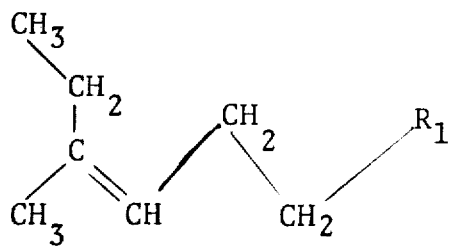

Column 10, lines 35 to 40, Claim 4, the formula should appear as shown below:

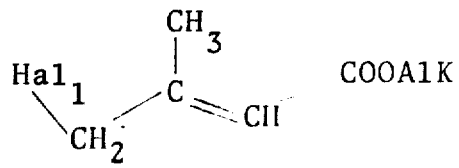

Signed and sealed this 5th day of November 1974.

(SEAL)
Attest:

McCOY M. GIBSON JR.
Attesting Officer

C. MARSHALL DANN
Commissioner of Patents